United States Patent [19]

Butler

[11] Patent Number: 4,474,053

[45] Date of Patent: Oct. 2, 1984

[54] STORAGE OR DISPOSAL CAVERN LEAK DETECTION AND LOSS PREVENTION

[75] Inventor: Wilburn J. Butler, River Ridge, La.

[73] Assignee: Diamond Shamrock Chemicals Company, Dallas, Tex.

[21] Appl. No.: 411,528

[22] Filed: Aug. 25, 1982

[51] Int. Cl.³ ............................................. G01M 3/26
[52] U.S. Cl. ..................................... 73/40; 73/40.5 R; 405/54
[58] Field of Search ............... 73/40, 40.5 R, 49.2, 73/49.3; 405/54, 55

[56] References Cited

U.S. PATENT DOCUMENTS

2,772,564  12/1956  Dougherty ................ 73/40.5 R
3,062,012  11/1962  Allen ........................ 73/40.5 R X
3,355,893  12/1967  Kuhne ...................... 405/54

Primary Examiner—S. Clement Swisher
Assistant Examiner—Joseph W. Roskos
Attorney, Agent, or Firm—John J. Freer; John P. Hazzard

[57] ABSTRACT

An environmentally acceptable gas is provided, under pressure, in the annulus of a casing arrangement which connects a wellhead to an underground storage zone containing stored product. Monitoring of the gas permits detection of leaks that might occur through casing leakage to an unsealed overburden. Leak detection and product loss prevention can be conducted without deleterious environmental impact.

49 Claims, 6 Drawing Figures

STORAGE OR DISPOSAL CAVERN LEAK DETECTION AND LOSS PREVENTION

BACKGROUND OF THE INVENTION

The containment, or storage, of large volumes of gases or of liquids with relatively high vapor pressure is economically possible only in underground caverns sufficiently deep so the overburden will allow the containment of the product in a pressurized state, while motivation of stored product in and out of storage can be accomplished without fear of fracture or loss through leakage into an overburden. Stored product is often hydrocarbons, and these are frequently gaseous at atmospheric pressure and ambient temperature, although they are most frequently in liquid condition in storage. Stored hydrocarbons include, for example, propane, butane or mixtures, including ethane and propane mixtures. But the product can be consistently liquid, for example crude oil in storage.

For convenience, these underground storage regions will frequently be referred to herein simply as "caverns." Such caverns can be prepared solely for containment or storage purposes, or may have had previous use, e.g., brine production wells. In such wells, stored product can be a hydrocarbon which, due to difference in specific gravities, supplants part of the brine in the cavern. For hydrocarbon removal, brine or water is introduced into the well, thereby forcing out the hydrocarbon.

For convenience in the discussion herein, the term "hydrocarbon" will be frequently used, but is to be understood as illustrative only, since other products are contemplated for storage or disposal, as will be more particularly discussed hereinbelow. An entry configuration, or passageway, to the cavern can contain a casing arrangement that will include a barrier casing, or "cemented" casing, that can be sealed, e.g., cemented, along its outer surface from the casing seat to the surface. Most typically a liner casing will also be present so that an annulus exists between the barrier and liner casings. As will be discussed more particularly hereinbelow, other inner casings may also be present. Hereinafter, all such casing arrangements will generally be discussed in connection with brine wells, but it is to be understood that such discussions are not meant to be restricted to wells, but are presented by way of illustration only.

In the cavern, e.g., a brine well used for hydrocarbon storage, the annulus between the barrier and liner casings will ususally contain hydrocarbon when the hydrocarbon is less dense than the brine. Since the annulus can be used to transport the hydrocarbon, any leakage can cause a serious problem, such as from economic losses and environmental damage. Moreover, because of the large quantities of stored hydrocarbons, slow leaks may not be quickly evident. Casings from brining operations may be especially susceptible to leakage because of the nature of the operation, i.e., the potential for corrosion due to the nature of the salt leaching operation. It must also be kept in mind that leakage can also occur from the annulus through the liner casing. Further, when the barrier casing does not extend down completely to the cavern roof, but rather to a point above the roof so that a lower borehole section extends to the cavern, leakage may occur at the casing seat or in this region of the completed depth of the barrier casing section which extends to the cavern.

It has been known to add a casing inside the liner casing and then fully block the annulus between the barrier and liner casings by inserting a packer as an obstruction in the annulus at a region above the seat of the liner casing. The annulus above the packer is then completely filled with liquid and pressure maintained on the liquid is monitored at the wellhead. But ambient temperature changes on the liquid system cause pressure fluctuations, even with small volume changes, which are not related to leakage and may therefore be misleading. Also, this arrangement does not allow for detection of leaks either at the barrier casing seat or in the extended borehole section below the seat. Moreover, with liquid filling, this method must rely on a completely blocked annulus.

Heretofore, it has also been known to conduct tests on the barrier and liner casings, prior to cavern use for hydrocarbon storage and at periodic workovers. Such test efforts comprised merely supplying liquid or gas to the cavern and then checking for changes, if any, in the supplied gas pressure under static conditions. If the results were acceptable, the test was completed, the gas removed and the casing arrangement was regarded as suitable for use with the storage of hydrocarbons in the cavern. Otherwise, where possible, it was repaired and retested. If the test could not be passed, the entry would be plugged.

It would therefore be desirable to provide for hydrocarbon storage where the full entry configuration from the cavern through the overburden can be monitored for leakage. It would be moreover desirable to provide a leakage detection system that will detect small leaks and prevent loss of product with associate conservation of natural resources. Through fast detection, associated with loss prevention, any leakage that does occur should have no, or reduced, environmental impact. In caverns or entries into porous strata used for disposal, it would be desirable to protect the annulus from corrosive materials and to be able to control situations wherein leakage may be occurring through the packer blocking the annulus. Further, such leakage detection and prevention arrangement should be adaptable for a variety of casing and equipment arrangements, while not necessarily being dependent on the use of special equipment. Simplicity of such a system, as well as ease in the monitoring of same, would also be highly desirable. The system should have the flexibility to provide for maintenance of sustained operation during small leakage as well as permit hydrocarbon removal for entry modification. It would also be desirable to facilitate replacement of the inner casing, in storage of sour or corrosive product, e.g., sulfur-containing hydrocarbon, when dictated by leak detection, through replacement in planned, preventive or emergency repair.

SUMMARY OF THE INVENTION

Systems are now provided that can easily and efficiently detect leaks in a variety of casing arrangements that connect to a cavern through an overburden. Representative systems are useful even for leak detection which may occur either at the seat of the barrier casing or in the completed depth of the casing section leading to the cavern. The system now provided presents flexibility as well as ease in monitoring. It need not require a packer, but can be useful with same. With the system of the present invention, leakage can lead to little or no adverse environmental effect. Furthermore, it is now possible to detect even minor leaks. During monitoring, casing arrangements can be maintained under elevated pressure, for fast response and possible subsequent entry modification, without fear of deleterious environmental impact.

In its broadest aspect, the invention is directed to an underground storage zone entry configuration containing a casing arrangement comprising a barrier casing member and a liner casing member, with an existing annular zone therebetween, wherein the barrier casing member extends along at least a portion of the length of the entry, and the liner casing member is at least coextensive in length with the barrier casing member, and the entry configuration interconnects an entry headspace with an underground storage zone containing product under pressure. In this broad aspect, the invention is directed to the improvement in the foregoing casing arrangement, which improvement comprises: (a) environmentally acceptable gas maintained under pressure, in the existing annular zone, which gas has a gradient less than the gradient of the contained product and which gas will be gaseous at ambient pressure and temperature, as well as under the pressure and temperature conditions of the existing annular zone; (b) a gas/liquid interface, between the environmentally acceptable gas and underground storage liquid, in the existing annular zone; and (c) means for continuously maintaining and monitoring pressure on the gas supplied to the existing annular zone during product containment.

One aspect of this invention includes applicability to both single entry and multi-entry caverns, including caverns having previous utility, such as wells, e.g., salt leaching wells or the like. Another aspect of this invention includes applicability to casing arrangements containing a hanging string, spaced inwardly from the liner casing member and thereby providing a next annular zone therebetween, with the hanging string extending substantially into the storage zone.

Yet another aspect of this invention is directed to a casing arrangement containing environmentally acceptable gas plus a plug assembly in the annular region, with the assembly permitting gas flow therethrough.

A still further aspect of the invention is directed to a casing arrangement containing a plug assembly supporting stabilized liquid. This arrangement may be especially adapted for use with disposal caverns.

For continuity herein, the terms described hereinbefore will be generally maintained hereinafter, e.g., "cavern," as well as the widest casing of the entry configuration being termed the "barrier" casing. Inside that, the next casing will be the "liner" casing. If there is yet another casing inside the liner casing, it will be referred to herein as the "hanging string," or as the "first hanging string," "second hanging string" and the like, if more than one casing is inside the liner casing. Although the invention is not bound to any particular relationships among the casings, it can be assumed that all such casings and strings are positioned in their normal modes, i.e., in concentric relationship with one another. Their relative lengths, e.g., lengths of extension starting at the entry headspace will be discussed more fully hereinbelow in reference to the particular entry configurations discussed, and more particularly in reference to the drawings.

For convenience, the environmentally acceptable gas will often be referred to herein simply as the "inert gas," or the "monitor gas," and the contained material, whether it be stored hydrocarbon or substance for disposal, will sometimes be referenced herein simply as the "product" or "stored product." Other terms used hereinafter, e.g., "monitor annulus," "product annulus," "motivating liquid" and "plug assembly" will be explained more particularly hereinbelow, generally at the first instance of usage in the description of the preferred embodiments.

DESCRIPTION OF THE PREFERRED EMBODIMENTS

A variety of casing arrangements can be found that serve as entry configurations in boreholes connecting from an underground cavern through the overburden to the entry headspace. In such arrangements, the outermost, or barrier, casing will typically extend partially down the borehole. For example, in a producing brine well, the barrier casing will usually extend from the entry headspace through the overburden, including the caprock, and terminate in the salt mass. This barrier casing can be suitably sealed in place by cementing. The cementing will be from the entry headspace to its furthest point down the borehole, which is termed the barrier casing "seat."

For purposes of discussion herein, reference will first be made to single entry caverns. For convenience, special reference will be made to such caverns as are formed from brining operation. Thus, the use of terms specific to wells, e.g., "wellhead" for the region of the borehole entry headspace, and the like, should not be construed as limiting the present invention. For a single entry cavern, the casing arrangement will typically contain a barrier casing and a liner casing, with the liner casing being at least coextensive in length with the barrier casing, although the liner casing will preferably extend from the wellhead down to about the roof of the cavern.

In the single entry casing arrangement, for purposes of the present invention, a hanging string, and typically only one or two such hanging strings are present, is provided from the wellhead into the lower regions of the cavern. For example, in a brine production and storage well, the first hanging string may extend to essentially full depth in the salt solution. Such hanging string is spaced inwardly, in the entry configuration, from the liner casing, typically in concentric relationship therewith. The annular zone, between this hanging string and the liner casing, can terminate at about the cavern roof in a well which is to be converted to storage.

For the multi-entry caverns, and for purposes of discussion herein, reference will be made to such caverns as are formed by a brine production well, there will be at least one entry configuration that can be used for product only. This can consist of only a barrier casing and a liner casing. A second entry configuration can serve for passage of either brine or water to or from the brine cavern. For this configuration, the liner casing will extend into the cavern brine. For a fuller explanation of the invention, and of the single entry and multi-entry configurations, reference will now be made to the drawings.

Figure 1:
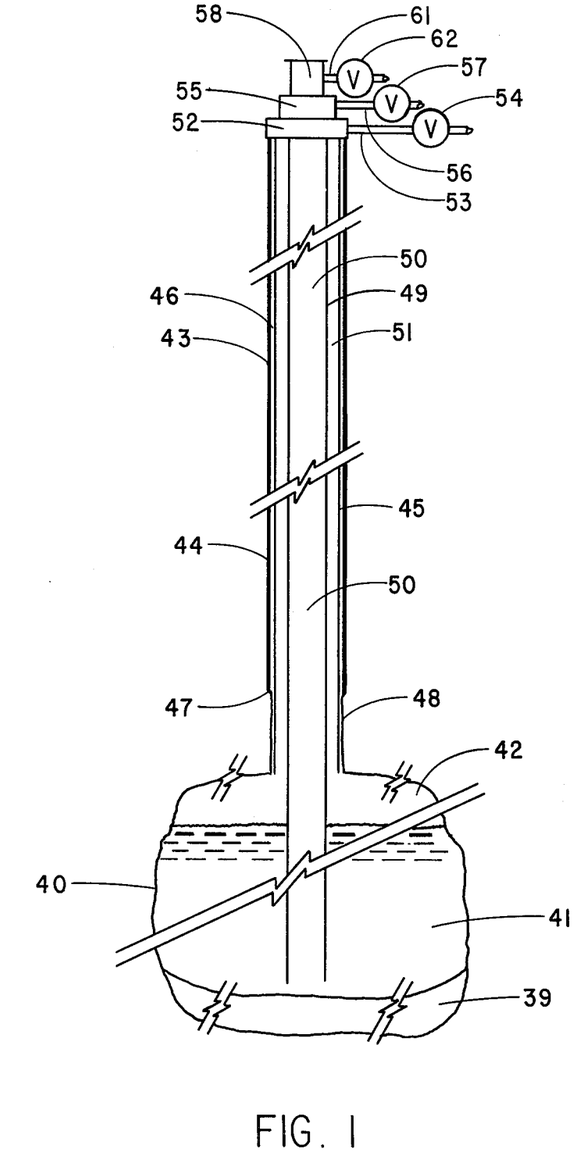
FIG. 1 is a vertical sectional view of an entry configuration for a single entry to a cavern formed by brine production, which cavern is in the product storage mode.

In FIG. 1, there is depicted a single entry casing arrangement to a storage cavern 40. For purposes of this illustration, the entry configuration is depicted in use with a brine production well, although it is to be understood that such arrangement is otherwise useful, e.g., where a fluid is to be induced into the cavern of a disposal well. The cavern 40, formed from brining operation, and depicted herein in a storage mode, is filled in the lower portion as the base with insolubles 39 such as anhydride sand over which is the brine solution 41. Above the brine solution 41 is a product storage zone 42 formed by brine displacement. Penetrating through the overburden to the top of the cavern is a borehole which contains the entry configuration casing arrangement that outwardly has a barrier casing 43. It is understood that other larger barrier casings, not shown, may also exist, depending on the nature and difficulties of drilling through the overburden. The depicted barrier casing 43 is the largest casing providing an inner conduit. This barrier casing 43 is, however, itself sealed in the borehole, as by cement 44. Spaced apart inwardly from the barrier casing 43 is the liner casing 45. The barrier casing 43 and the liner casing 45 form the existing annular zone 46, which is sometimes referred to as the outer annular zone 46 or "monitor annulus," so called because the inert or monitor gas useful for monitoring leak detection will be present in this annulus. Since the liner casing 45 extends from the wellhead, or entry headspace, all the way to the roof of the cavern 40, whereas the barrier casing 43 extends from the wellhead only to a casing seat 47 in the salt mass above the roof of the cavern 40, the monitor annulus 46 continues beyond the casing seat 47 through a lower borehole section 48 to the cavern 40.

Inwardly from the liner casing 45 is a hanging string 49, sometimes referred to herein as the "suspended string", which extends from the wellhead down into the cavern 40, through the product storage zone 42, to almost the bottom of the brine solution 41, but terminating above the insolubles 39. Along the length of the liner casing 45, this casing 45 and the hanging string 49 form a next or "inner" annular zone 51, also termed herein a "product annulus," i.e., the annulus in which product can be expected to be found, which product annulus 51 extends from the wellhead to the top of the cavern 40.

At the top of the wellhead, a lower cap section 52 connects the monitor annulus 46 through an inert gas line 53 and attendant inert gas wellhead block valve 54 to a gas supply source, as well as to pressure regulating, safety shut-off and monitoring equipment, all not shown. Above the lower cap section 52 at the wellhead, is an intermediate cap section 55 connecting the product annulus 51 through a product line 56 and attendant product wellhead block valve 57 to a product source, and attendant pressure metering and monitoring equipment, all not shown. The upper cap section 58 at the wellhead connects through a liquid flow line 61, with attendant liquid wellhead block valve 62, to a source of liquid, typically to both brine and water sources, and attendant pressure regulating and monitoring equipment, all not shown. The top of the wellhead serving the inner hanging string, Section 52 in the case of FIG. 1, normally contains a full opening valve, not shown, in line with the hanging string. Such valve allows the periodic installation of a proper packing arrangement for wireline logging to locate the gas/liquid interface. This allows cross checking of the interface level indicated by the installed instrumentation monitoring the system. At the wellhead, the liquid flow line 61 also connects to the brine-filled conduit 50 of the hanging string 49. For convenience, the upper portion of the general casing arrangement, including the cap sections 52, 55 and 58, plus attendant hardware, are often referred to herein as the "entry headspace" or "wellhead."

The general pressure and gas flow considerations for the arrangement illustrated in FIG. 1 pertain principally for leak detection and prevention. In order to protect against mechanical failure in the casing, which is a possibility especially where the entry goes through a severely fragmented overburden above a salt mass, an arrangement to restrict or severely limit the monitor annulus from upward gas flow, yet allow passage of the gas down past the casing seat, can be provided. This will permit passage of inert gas downward for the whole distance of the monitor annulus but prevent or severely limit back flow, particularly of stored product. Pressure monitoring and attendant considerations for this arrangement will be discussed more fully hereinbelow following the discussion of the drawings.

Figure 2:
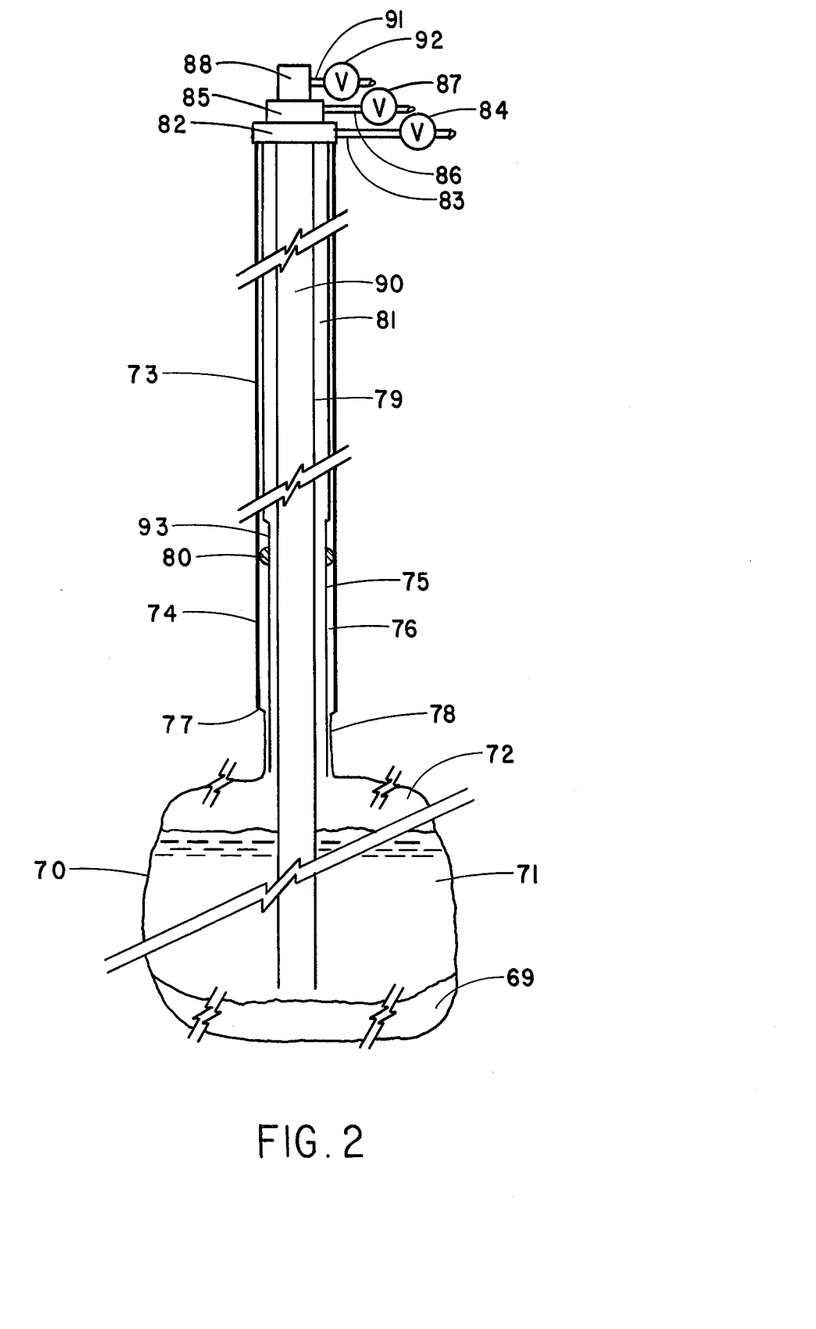
FIG. 2 is a vertical sectional view of an entry configuration, including plug assembly, for a single entry to a cavern, now in the product storage mode, but formed by brine production.

In FIG. 2, there is depicted a single entry casing arrangement to a storage cavern 70, which arrangement is nearly identical to the showing of FIG. 1. Thus, the illustration is for a storage well formed by brine production, but the arrangement need not be so limited. In FIG. 2, the cavern 70 is filled in the lower portion with brine solution 71 covering the insolubles 69, and above the brine solution 71 is a product storage zone 72. The outer or barrier casing 73 is cemented 74 in place, while inwardly therefrom is a liner casing 75. The liner casing 75 is depicted in two sections joined by a receptacle and seal nipple 93 which is used as a provision for casing expansion. Between the casings 73 and 75 is the monitor annulus 76, which extends downwardly from the barrier casing seat 77 through a lower borehole section 78 to the cavern 70. Located in this monitor annulus 76 above the lower borehole section 78 is a plug assembly 80. The term "plug assembly" as used herein is a general expression for packing arrangements, including cementing off of a length on an annular zone and the like, which may provide a complete blockage in an annulus to the passage of gas or liquid, but is also meant to include modified plug assemblies which, as the term is used herein, will permit passage of gas or liquid therethrough, chiefly only in one direction. Generally, plug assemblies that are complete blockage assemblies will be apparent by a review of the drawings in connection with the description thereof. Moreover, plug assemblies that are modified plug assemblies are generally used when such assemblies are in contact with gas directly above and below the assembly.

A hanging string 79 depends from the wellhead to the cavern 70, then downwardly through the product storage zone 72, extending well into the brine solution 71. The product annulus 81 between the liner casing 75 and the hanging string 79, is unencumbered.

At the top of the wellhead, a lower cap section 82 connects the monitor annulus 76 through an inert gas line 83 and inert gas wellhead block valve 84 to a gas supply source, as well as to pressure regulating and monitoring equipment, all not shown. Above the lower cap section 82 is an intermediate cap section 85 connecting the product annulus 81 through a product line 86 and wellhead block valve 87 to a product source, and attendant pressure regulating, safety shut-off and monitoring equipment, all not shown. The upper cap section 88 of the wellhead connects through a liquid flow line 91, with attendant liquid wellhead block valve 92, usually to brine and water sources, and attendant pressure regulating equipment and so forth, all not shown. At the wellhead, the liquid flow line 91 also connects to the brine-filled conduit 90 of the hanging string 79.

Figure 3:
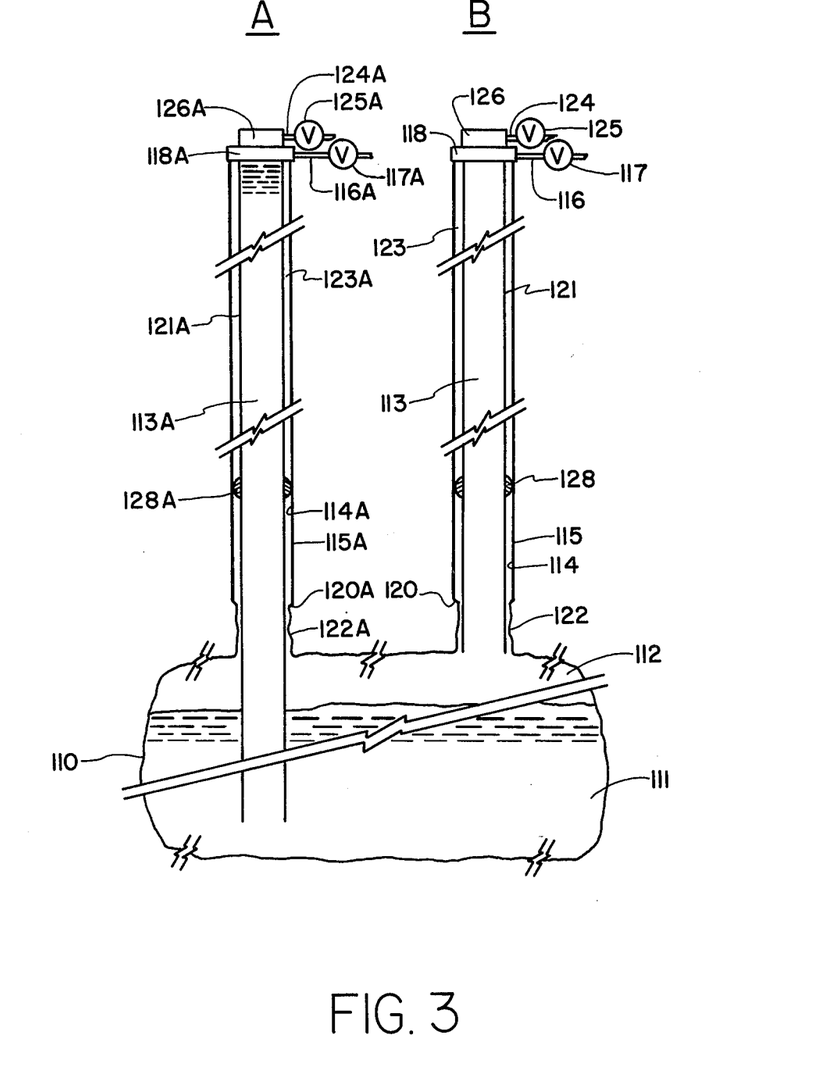
FIG. 3 is a vertical sectional view of a double entry cavern from a mature brine production well used for product storage and having an entry configuration for brine as well as a separate entry configuration for product.

Casing arrangements for multi-entry caverns can be more particularly understood by referring to FIG. 3, wherein there is depicted a representative double entry arrangement, in which a cavern 110 has been formed by a brining operation, for purposes of illustration only. Thus the cavern 110 contains brine solution 111 over insolubles, not shown, and under a product storage zone 112. In a first casing arrangement, or "product entry," depicted as arrangement "B" in the illustration, a barrier casing 114 extends through the overburden from the wellhead down to a casing seat 120 above the roof of the cavern 110. The barrier casing 114 is sealed in place by cement 115. A liner casing 121 is spaced inwardly from, and in concentric relationship with the barrier casing 114. The liner casing 121 extends from the wellhead to the storage cavern 110. The conduit 113 of this liner casing 121 can serve to introduce product to the product storage zone 112 and is thus itself filled by product. The monitor annulus 123 formed by the casings 114 and 121 extends downwardly, from the casing seat 120 as a lower borehole section 122 of the monitor annulus 123, to the cavern 110. This monitor annulus contains a plug assembly 128 near the casing seat 120. At the wellhead, the conduit 113 is connected in an upper cap section 126 by a product line 124, with attendant product wellhead valve 125, to a product feed source, including pressure regulating safety shut-off and metering equipment, all not shown. Also at the wellhead, the monitor annulus 123 is connected in a lower cap section 118 by an inert gas line 116 and attendant wellhead block valve 117 connecting with a gas supply source and gas pressure regulating and monitoring equipment, all not shown.

At a region of the cavern 110 removed from the region of the product entry, a second entry, or "motivating liquid" entry, is provided, such liquid being simply the water or brine or the like that can be in the casing arrangement and/or the storage cavern. This motivating liquid entry is depicted as arrangement "A" in FIG. 3. Suitable motivating liquids, including brine and/or water, will be further discussed hereinbelow. This entry contains a barrier casing 114A that is sealed in place by cementing 115A. A liner casing 121A is spaced inwardly from, and in concentric relationship with, the barrier casing 114A. The liner casing 121A extends from the wellhead down into the cavern 110, through the product storage zone 112, and into the brine solution 111. The barrier casing 114A extends down from the wellhead and terminates at the casing seat 120A above the roof of the cavern 110. The casings 114A and 121A thereby form a monitor annulus 123A which extends downwardly from the casing seat 120A as a lower borehole section 122A to the cavern 110. Near the casing seat 120A, the monitor annulus 123A contains a plug assembly 128A while, at the wellhead, this monitor annulus 123A is connected through a lower cap section 118A by an inert gas line 116A through a wellhead block valve 117A to a gas supply source, including pressure regulating and monitoring equipment, all not shown. The conduit 113A of the liner casing 121A is connected through an upper cap section 126A by a motivating liquid line 124A through a wellhead block valve 125A to a liquid source, including pressure regulating equipment, all not shown.

It may be desirable to provide the casing arrangement with a modified plug assembly providing a most reliable deterrent to mechanical failure of the assembly while also offering the opportunity of leak surveillance through the completed depth of the casing section. Such desirable features, further including ease of maintenance of the check, or upward flow restriction valve, have been depicted in FIG. 4. For purposes of this illustration, the entry configuration is depicted in use with a brine production well, although it is to be understood that the arrangement can be otherwise useful, e.g., where a fluid is to be induced or injected in the cavern of a disposal well. The cavern 140, formed from salt leaching and depicted herein in a storage mode, is filled in the lower portion at the base with brine solution 141, covering a cavern bottom layer of insolubles 139, with there being a product storage zone 142 above the brine solution 141. The entry configuration casing arrangment has a barrier casing 143 that is sealed in the borehole by cement 144. Spaced apart inwardly from the barrier casing 143 is the liner casing 145. The monitor annulus 146 formed between the casings 143 and 145 extends from the wellhead through a lower borehole section 147. The barrier casing 143 terminates in the salt mass at a casing seat 148 such that the lower borehole section 147 extends downwardly beyond the casing seat 148.

Figure 4:
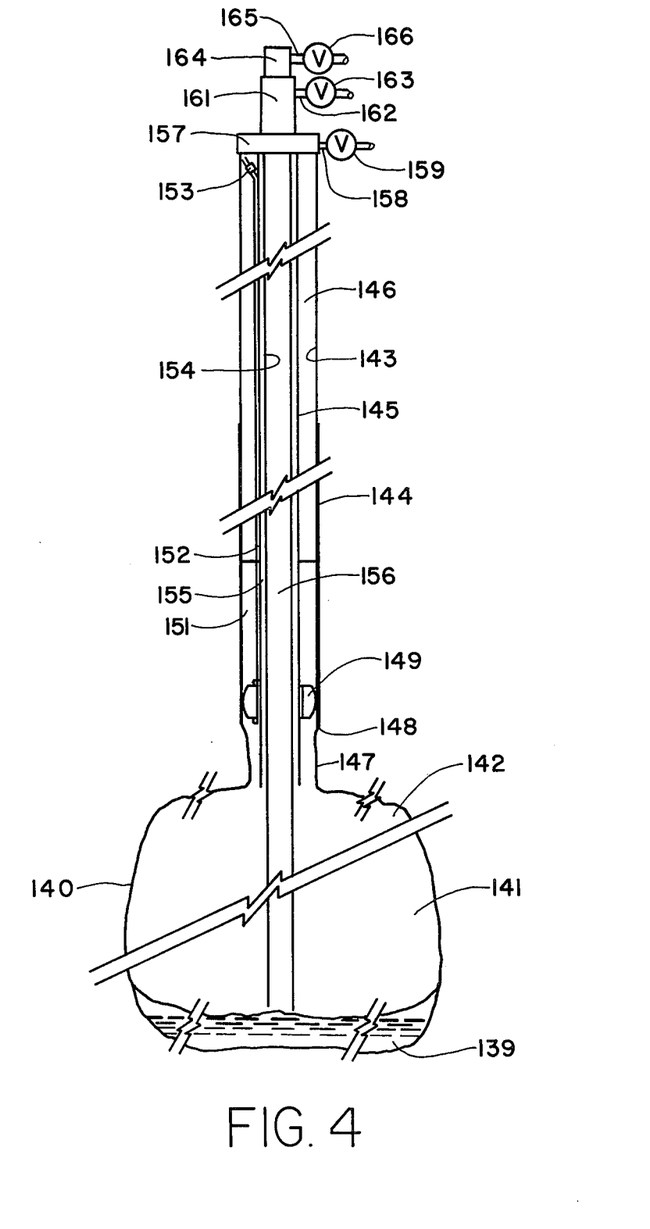
FIG. 4 is a vertical sectional view of a single entry cavern from a brine production well used for product storage and having a plug assembly entry configuration with gas equalizer modification, including readily accessible gas flow check arrangement.

Just above the casing seat 148, the monitor annulus 146 contains a modified plug assembly 149. Above the modified plug assembly 149, the monitor annulus 146 is partially filled as a cemented section 151 of the annulus 146. Extending downwardly from adjacent the wellhead, in the monitor annulus 146 and through the cemented section 151, as well as through the modified plug assembly 149, is a gas equalizer tube 152. At the top portion, this tube 152 contains a check valve 153.

The liner casing 145 extends down to the roof of the cavern 140. Spaced inwardly from the liner casing 145, a hanging string 154 suspends from the wellhead completely through the entry configuration into the cavern 140 and terminates near the bottom of the brine solution 141. The product annulus 155 formed between the liner casing 145 and the hanging string 154 is product filled. The hanging string conduit zone 156 is brine filled.

At the top of the wellhead, a lower cap section 157 connects the monitor annulus 146 through an inert gas line 158 and gas wellhead block valve 159 to a gas supply source, as well as to pressure regulating and monitoring equipment, all not shown. Above the lower cap section 157 at the wellhead is an intermediate cap section 161 connecting the product annulus 155 through a product line 162 and wellhead block valve 163 to a product source and attendant pressure regulating, safety shut-off, metering and monitoring equipment, all not shown. The upper cap section 164, above the intermediate cap section 161, is equipped with a liquid flow line 165, with attendant wellhead block valve 166, which connects the brine and water sources and attendant pressure regulating equipment, all not shown.

To provide for casing expansion, a receptacle and seal nipple arrangement, including liquid barrier, can be positioned in the monitor annulus. Although other locations are suitable, e.g., near the top of a plug assembly, it can be desirable to arrange for the presence of an additional assembly in the monitor annulus as a liquid barrier adjacent to the region of the wellhead, such as near the wellhead of FIG. 4. The surface arrangement will allow use of large overall diameter casing to accommodate the intricacies of providing a liquid at the seal nipple, along with necessary pressure equalization. This can all be accomplished by proper arrangement of tubing to accommodate an upward flow restriction (check) valve and seal features near or above ground. Such will allow for ease of inspection and repair or replacement necessary when workover is accomplished by removal of the wellhead. Moreover, such arrangement lends itself to unit preassembly before installation, which unit can then be also tested before installation. Such an arrangement is depicted in FIG. 5.

Figure 5:
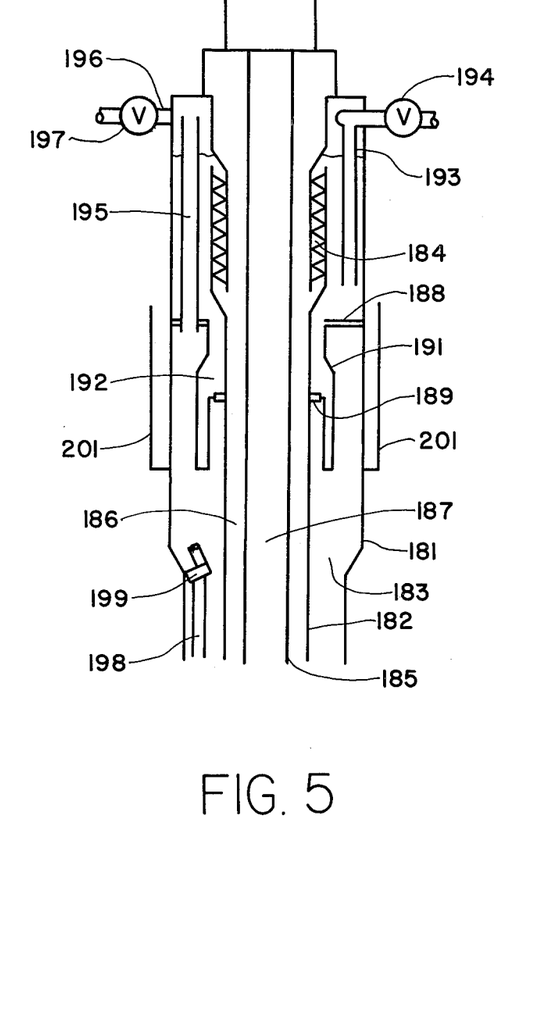
FIG. 5 is a vertical sectional view of an entry configuration headspace section containing a flooded seal nipple receptacle, with attendant gas equalizer modification having readily accessible gas flow check arrangement.

Referring more particularly to FIG. 5, a barrier casing 181, in combination with an inwardly spaced liner casing 182, forms a monitor annulus 183 therebetween. In the region adjacent the wellhead, the liner casing 182 is in two sections joined by a receptacle and seal nipple 184 which is useful as a provision for casing expansion. Spaced inwardly from the liner casing 182 is a suspended string 185 such that a product annulus 186 is formed therebetween. The product annulus 186 and conduit 187 of the hanging string are equipped at the wellhead with lines and valves, connecting typically with pressure monitoring and regulating equipment, all not shown. In the monitor annulus 183, a liquid barrier is provided by the combination of a barrier casing flange 188, plus liner casing ring 189 as supports for a flexible gasket seal 191. Above this liquid barrier, the monitor annulus 183 contains stabilized liquid 192, i.e., stabilized against bacterial growth and corrosion. Depending into this liquid 192 is a stabilized liquid line 193 with attendant valve 194 connecting at the wellhead with liquid monitoring equipment, not shown.

Figure 6:
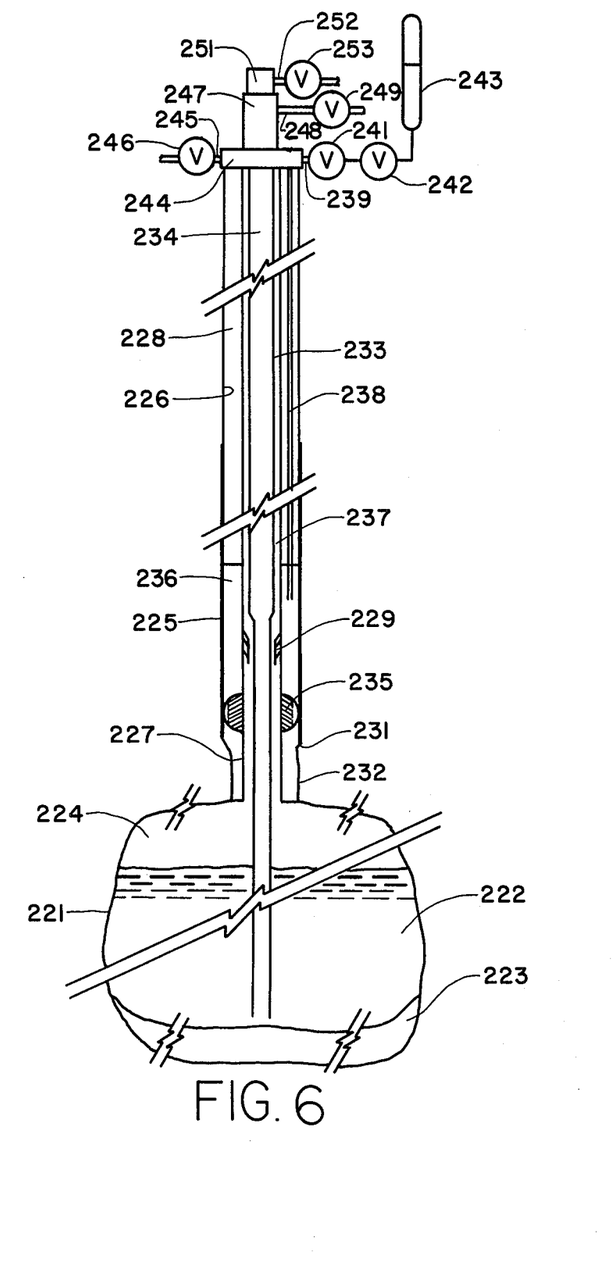
FIG. 6 is a vertical sectional view of a single entry cavern from a brine production well having a plug assembly and partially flooded entry configuration adapted for use in cavern storage of gaseous product.

The monitor annulus 183 also contains a gas-filled pressure equalizer tube 195 that extends from above the level of the stabilizing liquid 192 on through the barrier casing flange 188. This pressure equalizer tube 195 provides for inert gas equalization in the monitor annulus 183 above the stabilized liquid 192 and below the liquid barrier. Above the stabilized liquid 192, the gas filled monitor annulus 183 connects through an inert gas line 196 and attendant wellhead block valve 197 to inert gas pressure regulating and monitoring equipment, all not shown. Below the liquid barrier, the monitor annulus 183 contains a gas flow tube 198 for passage of inert gas down the monitor annulus 183 and through a plug assembly, e.g., as shown in FIG. 4. This gas flow tube 198 is provided with a check valve 199 restricting upward flow of monitor gas. As noted in the FIGURE, the sizing of the barrier casing 181 can be modified to increase, at the region adjacent the wellhead, the size of the monitor annulus 183 to accommodate the liquid barrier and accompanying elements. Also, the barrier casing 181 can be equipped with temperature measuring elements 201 as well as temperature control means, with connections at the wellhead to temperature monitoring equipment, all not shown. This can provide means for temperature control to offset ambient temperature changes effected by temperature changes in the product and/or the motivating liquid.

Where the product in storage is a gas, a primary consideration in leakage monitoring must usually be avoiding product contamination with a monitor gas. A casing arrangement suitable for use where product in storage is gaseous under storage conditions has been shown in FIG. 6. Although the illustration of FIG. 6 is depicted in storage formed by salt dissolution, such casing arrangement can be otherwise useful, as for example when product stored in a disposal well might be gaseous or yield gaseous by-products. Referring more particularly to FIG. 6, a single entry casing arrangement is depicted for a storage cavern 221. The cavern 221 is filled in the lower portion with brine solution 222 covering the insolubles 223, and above the brine solution 222 is a product storage zone 224. Cement 225 holds the barrier casing 226 in the overburden. Inwardly from the barrier casing 226 is the liner casing 227 such that the monitor annulus 228 is formed therebetween. The linear casing 227 is in two sections joined by a receptacle and seal nipple 229 which provides for casing expansion. The barrier casing 226 extends to a casing seat 231 such that the monitor annulus 228 continues as a lower borehole section 232 to the storage cavern 221. Both the lower borehole section 232 and the liner casing 227 terminate at the roof of the storage cavern 221.

Spaced inwardly from the liner casing 227 is a hanging strip 233 which extends from the wellhead through the product storage zone 224 to the lower portion of the brine solution 222 near the insolubles 223. The conduit 234 of the hanging strip 233 is filled with motivating liquid.

At the zone of the monitor annulus 228 adjacent the casing seat 231, and above the lower borehole section 232, the monitor annulus 228 is completely blocked, even to full obstruction for gas flow, with a plug assembly 235. Above the plug assembly 235, stabilized liquid 236 fills a portion of the monitor annulus 228. Below the plug assembly 235, the portion of the monitor annulus 228, including the lower borehole section 232, is filled with product. Likewise, the product annulus 237 between the liner casing 227 and hanging string 233 is product filled.

Extending from the wellhead, a stabilized-liquid-filled tube 238 depends into the stabilized liquid 236 above the plug assembly 235. At the wellhead, the stabilized-liquid-filled tube 238 extends through a stabilized liquid line 239 and attendant valve 241 on through a safety shut-off valve 242 to a monitor vessel 243. The lower portion of the monitor vessel 243 is filled with stabilizing liquid and above the liquid is inert gas, which is monitored by pressure and flow means, not shown.

At the wellhead, extending from a lower cap section 244, connecting with the monitor annulus 228, is an inert gas line 245 and gas wellhead block valve 246. The block valve 246 connects to a gas supply source and gas pressure regulating and monitoring equipment, all not shown. Above the lower cap section 244, an intermediate cap section 247 connects to the product annulus 237 through a product wellhead block 248 and product line valve 249 to a product source, and typically attendant pressure metering and monitoring equipment, all not shown. The upper cap section 251 of the wellhead connects through a liquid flow line 252, with attendant wellhead block valve 253, generally to brine and water sources, and accompanying pressure regulating equipment, all not shown.

The illustration of FIG. 6 has been depicted as a cavern formed by salt dissolution, but such general casing arrangement as has been depicted is furthermore particularly useful for a disposal cavern. Most usually this would be for use in a disposal cavern other than a well and as an arrangement thus not including a hanging string.

Referring again to FIG. 1, product for storage feeding from a source not shown, flows through the product control valve 57 and product line 56 on into the product annulus 51 of the borehole casing arrangement. As the product is introduced, brine is forced down the product annulus 51 and, as a result, brine in the conduit 50 of the hanging strip 49 is forced out the liquid flow line 61. From the product annulus 51, the product proceeds down to the product storage zone 42 of the cavern 40. Brine solution 41 not forced out the annulus 50 of the hanging string 49 remains in the cavern 40 below the stored product. Brine or water for product removal can be introduced at the wellhead by way of the liquid flow line 61.

The stored product from the product storage zone 42, unless otherwise prevented therefrom, will proceed to fill the monitor annulus 46, initially filling the lower borehole section 48. But in accordance with the present invention, environmentally acceptable gas is supplied to the monitor annulus 46, feeding to the wellhead from a source not shown, and passing through the gas wellhead block valve 54 and the inert gas line 53 at the wellhead. Most desirably, sufficient gas will be fed to the monitor annulus 46 to almost fill same, including the lower borehole section 48. Thereby a gas/product interface will be located at approximately the roof of the storage cavern 40. Referring to the static situation as an example, and assuming a gas/product interface at the roof of the cavern 40, if a leak occurs anywhere in the monitor annulus 46, including the lower borehole section 48, the gas/product interface will move upwardly in the monitor annulus 46 as the environmentally acceptable gas flows through the leak. Such a change in the interface level can be detected by monitoring equipment, not shown, that is in place in connection with the inert gas line 53. If the leakage from the monitor annulus 46 occurs inwardly through the liner casing 45 to the product annulus 51, such a leakage will again cause a change in the gas/product interface level which can be monitored in similar manner. This form of leakage will also yield a gas/product interface in the product annulus 51 at the wellhead, which will cause a pressure increase at the wellhead at the product line 56, and it is contemplated as a part of the present invention to detect such leakage by analysis, e.g., of the make-up of the substances in the product line 56 connecting with the product annulus 51 at the wellhead. Except for discussion relevant to FIG. 6, leak detection for the dynamic condition, e.g., during motivation of product into or out of the storage zone and with reference to the casing arrangements of the other FIGURES, will be discussed hereinbelow following the descriptions referring particularly to the drawings.

In FIG. 2, product for storage feeds from a source, not shown, through the wellhead block valve 87 and product line 86 into the product annulus 81. The manner of storing the product proceeds similarly to that already discussed for FIG. 1, it being understood that environmentally acceptable gas is supplied to the monitor annulus 76, passing freely down through the modified plug assembly 80, which restricts upward flow, thereby occupying the monitor annulus 76 including the lower borehole section 78 and forming a gas/product interface, typically at about the roof of the storage cavern 70.

Referring to the static situation as an example, and assuming a gas/product interface at about the roof of the cavern 70, if a leak occurs in the monitor annulus 76 above the plug assembly 80, either through the barrier casing 73 or the liner casing 75, this can be monitored from the inert gas line 83, and may be a determination of changing pressure, or of flow rate for maintaining constant pressure. The magnitude of leakage can be determined by observing the inert gas flow. That is, by observation at the inert gas line 83 of the flow which is necessary to maintain constant pressure in the monitor annulus 76. If the leakage is minor, maintenance of inert gas pressure may substantially stabilize the gas/product interface, since the check valve in the modified plug assembly 80 restricts upward flow of monitor gas.

With the arrangement of the modified plug assembly 80 permitting upward flow of inert gas, although restricted, and hence upward displacement of the gas/product interface, the pressure loss for the monitor gas is twofold. It is partially due to the volume loss of monitor gas in the monitor annulus 76 above the plug assembly 80. This loss is not readily compensated for by upward gas flow through the assembly 80. The pressure loss will also be partially due to displacement. That is, displacement of such monitor gas as does gradually move upwardly in the monitor annulus 76 through the plug assembly 80. As it does so move, it is thereby displaced by product, as the gas/product interface moves upwardly, at first into the lower borehole section 78 of the monitor annulus 76. If the leakage is small, sufficient inert gas pressure can be maintained on the monitor annulus 76 to compensate for the leakage and thereby maintain the gas/product interface at about the roof of the cavern 70.

Likewise, for a leak in the monitor annulus 76 occurring below the plug assembly 80, e.g., through the casings 73 and 75 or at the casing seat 77, a pressure loss for the inert gas can be observed at the wellhead. This is also a combination result, partly due to the loss of inert gas caused by the leak and also due to displacement. Furthermore, a leak through the liner casing 75 will create a pressure increase in the product annulus 81 due to the differential gradients in the monitor gas and the product, which increase can be detected at the wellhead, such as at the product line 86. As was also discussed in reference to FIG. 1, a leakage anywhere through the liner casing 75 may also be detected and defined by analysis of the monitor gas content in the product, e.g., at line 86 connecting with the product annulus 81 at the wellhead.

In referring again to FIG. 3, product for storage proceeds from a source not shown to the product entry, or entry "B" in the illustration, through the product line 124 and on into the conduit 113 of the liner casing 121 whereupon it proceeds down to the product storage zone 112 of the cavern 110. Brine solution 111 remains in the cavern 110 below the product storage zone 112. Such brine solution also occupies the conduit 113A of the liner casing 121A of the motivating liquid entry, or entry "A" of the FIGURE. Brine removal, or make-up water for the conduit 113A of the liner casing 121A of the motivating liquid entry can be added at the wellhead through the motivating liquid line 124A. The stored product from the product storage zone 112, unless otherwise prevented therefrom, will enter the lower borehole sections 122 and 122A, as has been discussed in reference to FIG. 2. However, in the manner as has been discussed for FIG. 2, inert gas is fed to both the product entry and motivating liquid entry, from a source not shown, and proceeds through the inert gas lines 116 and 116A, the monitor annuli 123 and 123A, past the plug assemblies 128 and 128A, thereby establishing a gas/product interface, for each entry, at approximately the roof of the cavern 110.

Referring to either the product entry or the motivating liquid entry, and considering a static situation while assuming a gas/product interface at the region of the roof of the cavern 110, leak detection can be handled in the manner as has been discussed in reference to FIG. 2. It can be appreciated that where the arrangement of the present invention is not present, a leak of less than a very great magnitude, e.g., through a lower borehole section 122 or 122A or a barrier casing 114 or 114A, may not be otherwise evident in a timely fashion, owing to the very great proportion of product that may be present in the product storage zone 112 and the enormity of the product that must first leak to provide for even a minor contraction in the volume of such product storage zone 112. Small leaks, which are both economically undesirable and environmentally unacceptable, may be virtually impossible to otherwise detect.

In referring to FIG. 4, the operation of feeding product for storage to the cavern 140 is done in a similar manner to that already discussed by reference to FIG. 2. However, referring particularly to FIG. 4, the manner of preventing the back flow of product into the monitor annulus 146 is as follows. Inert gas feeding through the gas wellhead block control valve 159 and inert gas line 158 fills the monitor annulus 146 above the cemented section 151. Also, the inert gas proceeds through the check valve 153, which restricts upward gas flow, and on into the gas equalizer tube 152, thereby proceeding down through the cemented section 151 and plug assembly 149 in unobstructed flow, into the lower borehole section 147 of the monitor annulus 146. Thus the gas/product interface can be established at the roof of the cavern 140.

For leaks that might occur from the monitor annulus 146, e.g., through the barrier casing 143 or the liner casing 145, detection is similar to that discussed hereinabove for FIG. 2. For example, monitoring equipment, not shown, can be used to determine the change in the gas/product interface level as such rises in the monitor annulus 146 occasioned by such leak.

Referring to FIG. 5, stabilized liquid, feeding from a source not shown, flows through the valve 194 and stabilized liquid line 193 thereby occupying the zone above the gasket seal 191. This flow of stabilized liquid is continued until the receptacle and seal nipple 184 of the liner casing 182 is covered, but is discontinued so as not to reach the top of the pressure equalizer tube 195. After the valve 194 is closed, a monitor gas/product interface is established in a manner similar to that which has been described by reference to FIG. 4. Thereafter, the monitor vessel, not shown, connecting through to the valve 194, can be partially filled with stabilized liquid and the balance with monitor gas, the valve 194 opened, and then the monitor vessel gas pressure is equalized with the gas pressure in the monitor annulus 183. For a leak in the monitor annulus 183, either through the barrier casing 181 or the line casing 182, reference can be made in general to the above discussion with regard to leak detection in the monitor annulus of FIG. 4.

Since the liquid covers the receptacle and seal nipple 184, the liquid is not so likely to leak through same as would be the case with a monitor gas. This arrangement can therefore provide for the advantage of maintaining a most elevated pressure on the monitor gas, thus allowing for continuous monitoring of the monitor annulus 183 at above the operating pressure associated with the stored product. Such elevated pressure can be particularly useful in the upper portions of the monitor annulus 183 where the overburden environment adjacent the barrier casing 181 is more likely to cause problems because of structural discontinuities. Also in FIG. 5, inherent changes in volume of the monitor gas due to temperature of pressure changes can be deamplified by imposing temperature control at the barrier casing 181 after such need is detected by means of the temperature measuring elements 201. Although reference hereinabove has been made to the integration of the elements between FIGS. 4 and 5, it should be understood that the general arrangement of FIG. 5 has broad application. For example, it is contemplated that such arrangement could be useful at the wellhead of FIG. 2.

Storage or disposal caverns particularly adapted for storage of a gas, such as the one shown in FIG. 6, can have a plug assembly 235 blocking the monitor annulus 228. In reference to FIG. 6, product for storage feeding from a source not shown flows through the product wellhead block valve 249 and product line 248 on into the product annulus 237. As the product is introduced, brine is forced down the product annulus 237 and, as a result, brine in the conduit 234 of the hanging string 233 is forced out the liquid flow line 252. From the product annulus 237, the product proceeds down to the product storage zone 224 in the storage cavern 221. Brine solution 222 not forced out the conduit 234 of the hanging string 233 remains in the cavern 221 below the stored hydrocarbon. The product proceeds from the hydrocarbon storage zone 224 to occupy the lower borehole section 232 of the monitor annulus 228 up to the plug assembly 235. Also, liquid that is typically a stabilized liquid, feeding from a source not shown, can flow through the valve 241 and stabilized liquid line 239 to occupy the portion of the monitor annulus 228 above the plug assembly 235. As shown in FIG. 6, this liquid entering the monitor annulus 228 will also cover the receptacle and seal nipple 229 and be of sufficient quantity to cover the lower depending portion of the stabilized liquid filled tube 238. Then inert gas, feeding from a source not shown, flows through the gas wellhead block valve 246 and inert gas line 245 into the monitor annulus 228, occupying the space therein above the liquid. Since the liquid at the receptacle and seal nipple 229 is not so susceptible to leakage as would be the inert gas, an enhanced seal is provided. So this arrangement allows for continuous leak detection capability for the barrier casing 226 and liner casing 227 at an inert gas pressure above the operating pressure maintained on the product in the product annulus 237. Moreover, such elevated pressure is maintained on that portion of the barrier casing 226 where the overburden environment is more structurally discontinuous and therefore more likely to cause leakage problems.

Referring to either the static or dynamic situation with respect to product in storage or motivation of product in or out of storage, if a leak occurs either in the barrier casing 226 or liner casing 227, it can manifest itself as a loss of pressure in the monitor gauge 243. Or, if constant pressure is maintained in the monitor vessel 243, a leak in either casing 226 and 227 will be observed by a drop in the liquid level in the monitor vessel 243, so long as the monitor gas pressure is kept above the product pressure. The arrangement in FIG. 6 can provide the advantage of readily distinguishing a small leak, with simplistic instrumentation, by means of a volume change, as opposed to strict reliance on pressure change. Moreover, from the monitoring provided by the arrangement in accordance with this FIG. 6, leakage through the plug assembly 235, when a corrosive material is being disposed of, can be detected and damage prevented by purging an acceptable gas or liquid through the leaking plug assembly 235.

The means for continuously maintaining and monitoring pressure on the environmentally acceptable gas will generally be furnished by such equipment as is typically in use with gases under pressure, e.g., in use with pressurized nitrogen gas. Thus conventional pressure regulating and pressurizing equipment can be used. Monitoring equipment may include a vessel for viewing a gas/liquid interface, as shown in FIG. 6. Preferably, the pressure maintenance means, for most efficient leak detection, will keep the monitor gas at a more elevated wellhead pressure, than the wellhead pressure on stored product.

The stored product may include solids in its stored condition, as well as being liquid, gaseous or a mixture thereof. In a disposal well, for example, if the stored product, in this case a "disposed product," contains solids it is contemplated that the present invention will be useful where there is the possibility of a by-product, e.g., a gaseous by-product, resulting from such disposal of the solid. Otherwise, the stored products in their stored condition are liquid, gaseous or their mixtures, and most typically will be liquid. In general, the use of the present invention for the storage of gaseous materials will be in accordance with FIG. 6. However, other aspects of the invention can be useful for the storage of some gaseous substances which are not in substantially the liquid state when stored. For example, the invention as broadly contemplated will be generally useful for the storage of ethylene since typical ambient temperature storage conditions are above its critical temperature, resulting in its storage as a dense gas. Thus, special situations such as this exist, but otherwise the invention will be used in a manner so as to avoid a gas/gas interface between the environmentally acceptable gas and the stored product. A gas/gas interface can lead to an undesirable mingling of gases, and loss of interface. Therefore, the entry configuration of FIG. 6 should be the arrangement of choice for the storage of ethylene and natural gas, as examples.

Most always, the stored product is a hydrocarbon. Such stored hydrocarbons can be liquid, as exemplified by diesel oil or crude oil. Also, they can be gases under ambient, above-ground conditions, but liquids under the conditions of storage, e.g., propane and ethane/propane mixtures. In practice, when storage is made in a cavern containing a pre-existing liquid, such as the brine of a brine production well, the stored product in liquid condition will most always have a lesser specific gravity than the pre-existing liquid. This allows for product storage at the upper region of the storage cavern. In such situations where product is being stored and product recovery will be effected, the present invention is not contemplated for use unless the material at the upper cavern region, from any source, might be considered as environmentally unacceptable, e.g., as unacceptable for the entry configuration, or to the surrounding overburden, or in unconfined condition above-ground. Hence, the present invention will be useful where the cavern has been formed from salt leaching and a hydrocarbon pad, e.g., diesel or fuel oil, protects the cavern roof from dissolution. In such case, storage of a heavy product such as ethylene dichloride, will lead to product storage at the lowest region of the cavern. For this arrangement, a monitor annulus between barrier and liner casings, can not only provide leak detection, but also help prevent loss of the hydrocarbon pad should a leak occur, e.g., at the seat of the barrier casing. Moreover, without threat of pad loss, the arrangement of the present invention will be useful under such storage situation since otherwise brine could occupy the monitor annulus and brine leakage through the barrier casing could threaten water sands. In this storage situation, the gas/liquid interface may thus be established between monitor gas and brine, or between monitor gas and hydrocarbon pad liquid. Also for such storage situation, product can be contained in a hanging string, when present, and motivating liquid can be present in the product annulus.

For use as the environmentally acceptable gas, such may be argon, nitrogen, helium, as well as mixtures thereof, with nitrogen being preferred for economy. Additionally, an acceptable gas may be a low molecular weight hydrocarbon, or mixture thereof, or mixtures of such hydrocarbon with the foregoing mentioned gases. Thus, methane or, for example, a methane/nitrogen mixture, might be acceptable to serve as the environmentally acceptable gas in areas of remote population. Exhaust gases from an internal combustion engine might be used if the moisture and carbon dioxide present will not cause a corrosion problem. Moreover, so long as flammability is not a concern the gas or gas mixture could be or include oxygen or air.

It is critical that the environmentally acceptable gas be gaseous at ambient pressure and temperature including the pressures and temperatures typically found at the wellhead. This is necessary in monitoring the gas contained in the monitor annulus of the casing arrangement. Moreover, it is important that this gas be gaseous under the pressure and temperature conditions of the monitor annulus. It is furthermore most critical that the gas have a lesser gradient than the gradient of the stored substance. As used herein, the "gradient" is the weight of the substance when in liquid condition, expressed in pounds per square inch, for a foot of depth of substance. As an example, under ambient conditions of one atmosphere pressure and 60° F. temperature, a foot of depth of distilled water in a column has a pressure of 0.433 pound per square inch, making the "gradient" of this substance 0.433.

The monitoring can be carried out with greatest ease when the cavern is under static or no flow conditions. When sufficient product has been added to storage to raise the inert gas level in the monitor annulus, additional inert gas can be introduced into such annulus and the depth of surveillance reclaimed. Any needed adjustments for the inert gas pressure at the wellhead can be handled by straightforward calculation.

Monitoring equipment can be provided to detect leaks even when the cavern is in operation, e.g., during addition or removal of product, or during continuing brine production. This can most accurately be done by providing an impulse tube down through the product annulus to the roof of the cavern. An alternative is to use criteria which effect operating pressures, such as gas flow rate and flow direction, in conjunction with properly programmed instrumentation, preferably along with computer capability. By knowing the pressure of the product at the cavern roof, inert gas pressure in the monitor annulus can be maintained at a proper relationship with the roof pressure, which will indicate product inventory, so long as leakage does not exist. Deviation from this proportionate requirement will indicate leakage and require corrective action.

The monitoring and allied equipment for obtaining product pressure at the cavern roof as well as other data for leak detection for both the static and the operational mode, is similar but less complicated in caverns with more than one entry. By having the product entry as a separate entry from the motivating liquid entry, the arrangements for gathering the needed pressure data are simplified. To use this method to detect leaks in such storage wells, e.g., brine caverns, the pressure for the environmentally acceptable gas must be correlated with either the brine pressure at the wellhead of the motivating liquid entry, or with the product pressure at the wellhead of the product entry, or with both. An increase in brine pressure increases both the product and the gas pressure due to the U-tube effect. The appropriate correlation can be handled by measuring the different pressures.

In a storage cavern in a solid mass, such as a cavern in an operating brining well, leakage at the seat of the barrier casing can be of concern, i.e., at the zone where the liner may lead to a discontinuity in the seal of the salt mass. For this structure, it is advisable that there be a lower borehole section well below the barrier casing seat, extending to the cavern. In such arrangement, a leak at the casing seat will allow for sufficient migration of the gas/product interface up the monitor annulus, i.e., gas displacement by the product, as to permit ready leak detection before the seat level is reached by the interface. Where no or little borehole exists and leakage occurs in the barrier casing, flow monitoring to hold constant inert gas pressure can suffice for detection if the interface can be maintained below the leak. Moreover, since mechanical failure and casing leakage is a greater risk above the salt mass, a plug assembly, when present in the monitor annulus, will preferably be placed therein below the top of the salt.

Where a well is being used for storage, and liquid will be flowing to or from the cavern as stored product is being stored or used, the typical liquids for use include water and brine. Generally, the liquid for use need only be such as will maintain its liquidity in the cavern under the temperature and pressure conditions existing therein. Preferably, for economy and stability, brine is the liquid of choice. Where a liquid is used in the monitor annulus, e.g., to cover a receptacle and seal nipple as shown in FIG. 6, a liquid for extended use is advantageous. Such liquids should generally be noncorrosive, not be serious product contaminants, as well as maintaining their liquidity under the temperature and pressure conditions of use. Such a liquid may be water or deoxygenated brine, containing an antibactericide, or a liquid hydrocarbon such as fuel oil or naphtha. Because these liquids may contain additives and be needed for extended use, they may be referred to herein as "stabilized liquid." Where the stabilized liquid is used in conjunction with a gasket seal, such as shown in FIG. 5, the gasket seal material can suitably be neoprene or a neoprene impregnated fabric.

In arrangements where liquid covers a receptacle and seal nipple, such as shown in FIG. 6, the monitor gas can be maintained in the monitor annulus under high pressure. This can facilitate a balancing of the pressure, on the monitor annulus side of the seal, with the pressure exerted by the product from the product annulus side of the seal. This also provides for a continuous high pressure test on the monitor annulus.

The following embodiment will serve to illustrate the invention. The cavern 40 of FIG. 1 has been formed by solution mining, and the roof of the cavern 40 is several hundred feet below the top of the salt in a salt dome. The cavern is used for the storage of a hydrocarbon mixture containing 80 percent ethane and 20 percent propane, also referred to herein as 80/20 EP. The hanging string 49 extends several hundred feet below the cavern roof. The barrier casing 43 is cemented into the dome with its seat 47 about 75 feet above the roof which is 1800 feet deep. The lower borehole section 48 in the rock salt thus continues the cavern entry for the 75 feet from the casing seat 47 into the roof. The liner casing 45 extends past the barrier casing seat 47 and past the lower borehole section 48 to a level essentially even with the roof of the cavern 40, 1800 feet below the surface. The monitor annulus 46 between the cemented barrier casing 43 and the liner casing 45 contains nitrogen as the monitor gas. The product annulus 51 is the 80/20 EP product conductor and the conduit 50 of the hanging string 49 is the brine conductor.

The 80/20 EP product-brine interface is 200 feet below the roof of the cavern 40 and 50 psig brine pressure exists on the brine at the wellhead surface. Under these conditions, the pressure at the product-brine interface is approximately 1080 psig, the pressure of the 80/20 EP product at the cavern 40 roof is 1050 psig and the pressure of such product at the wellhead surface is 730 psig.

The monitor annulus 46, including the lower borehole section 48, has a volume of approximately 450 cubic feet, or 80.2 barrels. One barrel will fill about 22.4 feet of depth in this monitor annulus 46. By the introduction of nitrogen into this annulus 46 all the way down to the roof of the cavern 40, a surface pressure of the nitrogen at the wellhead of approximately 989 psig is obtained. This is the roof pressure minus the weight of nitrogen. This pressure is monitored at the inert gas line 53, by conventional pressure monitoring equipment.

The key to the leak detection is the leaking of nitrogen rather than the 80/20 EP product from the monitor annulus 46. The difference in the gradients between the 80/20 EP and the nitrogen is approximately 0.144 psi per foot. The leakage of one barrel of nitrogen from the monitor annulus 46 through the barrier casing 43 results in the replacement of that barrel with 80/20 EP product at the bottom portion of the annulus 46. This results in 22.4 feet movement of the 80/20 EP product-nitrogen interface up from the roof of the cavern 40 into the annulus 46. Ten barrels of nitrogen leakage results in a 224 foot displacement and reduced surface nitrogen pressure in the annulus 46 at the wellhead of about 33 psi. Due to the elasticity of the cavern and the compressibility of the materials in the cavern 40, a leak of this nature through the liner casing 45 will manifest itself in substantially the same way. Of course, such an internal leak will also manifest itself at the wellhead in the product annulus.

By comparison, if the arrangement of the present invention is not in use, whereby product can occupy the monitor annulus, a ten-barrel leakage of product from the monitor annulus 46 will not cause a detectable change in the "product-brine interface," i.e., the interface between the product storage zone 42 and the brine solution 41 inside the cavern 40. If the diameter of the cavern 40 for the first several feet of depth from the roof is 200 feet, each foot of depth can contain 5600 barrels. A product leak of ten barrels will thus change this "product-brine interface" level only 0.0214 inch, or only slightly more then 1/47 inch. Such a change in level will effect a change in pressure of only 0.006 psi on the 80/20 EP product in the product line 56 at the wellhead. A change of many times this magnitude would be necessary to reliably detect, or to distinguish from other effects on the product pressure in the cavern 40.

As additional 80/20 EP product is added to storage, the roof pressure in the cavern 40 will increase approximately 17.8 psi for each 100 feet of additional storage depth. This 17.8 psi pressure increase will force the product-nitrogen interface in the monitor annulus 46 up about 47 feet. This change in the depth of storage can then be compensated for in the increasing of the nitrogen pressure in relation to the product pressure.

If a leak from the barrier casing 43 is detected while it is small, the maintenance of inert gas pressure may allow either sustained product storage operation until the cost of the inert gas leakage is prohibitive, or allow removal of the product for entry modification. When other entry arrangements are provided, such as in FIGS. 2, 3, 4 and 6, the product may be contained. This will allow for orderly emptying of the cavern and repair or modification as workover, inspection and testing dictate.

What is claimed is:

1. In an underground storage zone entry configuration containing a casing arrangement comprising a barrier casing member and a liner casing member, with an existing annular zone therebetween, wherein said barrier casing member extends along at least a portion of the length of the entry and said liner casing member is at least coextensive in length with the barrier casing member, and said entry configuration interconnects an entry headspace with an underground storage zone containing a product under pressure, the improvement for said entry configuration which comprises:
   (a) environmentally acceptable gas maintained under pressure, in said existing annular zone, which gas has a gradient less than the gradient of contained product and which gas will be gaseous at ambient pressure and temperature, as well as under the pressure and temperature conditions of said existing annular zone;
   (b) a gas/liquid interface, between said environmentally acceptable gas and underground liquid, in the existing annular zone; and
   (c) means for continuously maintaining and monitoring pressure on said gas supplied to said existing annular zone during product containment.

2. The entry configuration of claim 1 further characterized by containing a hanging string, spaced inwardly from said liner casing member and thereby providing a next annular zone therebetween, said hanging string extending substantially into said underground storage zone.

3. The entry configuration of claims 1 or 2 wherein said barrier casing member terminates at a casing seat above the roof of the underground storage zone, whereby said existing annular zone continues as a lower borehole section extending from said casing seat to the storage zone roof and said liner casing member terminates at least about the region of the roof of the storage zone.

4. The entry configuration of claim 3 wherein a gas/liquid interface is established at approximately the roof of the underground storage zone or in the region thereabove in said existing annular zone.

5. The entry configuration of claims 1 or 2 further characterized by a termination point for said barrier casing member at the region of the roof of said underground storage zone and a termination point for said liner casing member of at least the casing seat for said barrier casing.

6. The entry configuration of claim 5 wherein a gas/liquid interface is established in said existing annular zone at approximately the casing seat of said barrier casing.

7. The entry configuration of claims 1 or 2 further characterized by having a modified plug assembly positioned in said existing annular zone above the gas/liquid interface, while gas flow restriction means provides for passage of environmentally acceptable gas through the plug assembly.

8. The entry configuration of claim 7 wherein said modified plug assembly contains said gas flow restriction means, with said assembly providing ease of gas flow towards said storage zone.

9. The entry configuration of claim 7 wherein said gas flow restriction means are in combination with gas equalizer means, and said equalizer means permits unobstructed gas flow through said modified plug assembly.

10. The entry configuration of claims 1 or 2 further characterized by having a plug assembly positioned in the existing annular zone and obstructing gas flow therein, while also having liquid present in a portion of said existing annular zone above said plug assembly, thereby establishing said gas/liquid interface in said zone, above said plug assembly.

11. The entry configuration of claim 10 wherein said means for continuously maintaining and monitoring pressure for said gas further includes means for monitoring the level of said gas/liquid interface.

12. The entry configuration of claim 10 wherein liquid is present in a portion of said existing annular zone containing a receptacle and seal nipple section of said liner casing.

13. The entry configuration of claim 2 characterized by being the sole entry to said underground storage zone.

14. The entry configuration of claims 1 or 2 characterized by being one of a number of entries to said underground storage zone.

15. The entry configuration of claim 1 wherein noncorrosive, environmentally acceptable gas is in said existing annular zone.

16. The entry configuration of claims 1 or 2 wherein the gas in said existing annular zone is selected from the group consisting of argon, nitrogen, helium, oxygen, air, hydrocarbons and mixtures of the foregoing, with the proviso that when the product in storage includes hydrocarbon, the hydrocarbon is said existing annular zone is of lower molecular weight than the predominant hydrocarbon in said storage zone.

17. The entry configuration of claims 1 or 2 wherein said barrier casing member is sealed in place along at least a portion of its outer surface.

18. The entry configuration of claim 2 wherein said next annular zone serves as a conduit for conveying product between the entry headspace and said underground storage zone.

19. The entry configuration of Claims 1 or 2 wherein said gas/liquid interface is established between said environmentally acceptable gas and an underground liquid selected from the group consisting of stored product, stabilized liquid, hydrocarbon pad liquid and brine.

20. The entry configuration of claims 1 or 2 wherein said means for continuously maintaining and monitoring pressure for said gas includes means for maintaining said gas at a pressure in said existing annular zone higher than the other pressures at the wellhead.

21. The entry configuration of claim 1 wherein said gas/liquid interface is maintained in said existing annular zone, and product or motivating liquid is contained in said liner casing member.

22. The entry configuration of claim 2 wherein said gas/liquid interface is maintained in said existing annular zone, while product and motivating liquid are also contained in said entry configuration.

23. The entry configuration of claim 22 wherein product occupies said next annular zone and motivating liquid is present in said hanging string.

24. The entry configuration of claim 22 wherein motivating liquid occupies said next annular zone and product is present in said hanging string.

25. The entry configuration of claims 1 or 2 further characterized by containing a substantially flexible liquid barrier assembly positioned in said existing annular zone in the region adjacent said entry headspace.

26. The entry configuration of claim 25 wherein said liquid barrier assembly retains stabilized liquid in said existing annular zone in a region of said liner casing having a receptacle and seal nipple arrangement.

27. In an underground storage zone entry configuration containing a casing arrangement comprising a barrier casing member and a liner casing member, with an existing annular zone therebetween, wherein said barrier casing member extends along at least a portion of the length of the entry and said liner casing member is at least coextensive in length with the barrier casing member, and said entry configuration interconnects an entry headspace with an underground storage zone containing product under pressure, the improvement in said entry configuration which comprises:

(a) a plug assembly in said existing annular zone; which plug assembly plugs the flow of fluid to the underground storage zone;
(b) a substantially flexible liquid barrier assembly positioned in said existing annular zone in the region above the plug assembly;
(c) environmentally acceptable gas maintained under pressure, in said existing annular zone which gas has a gradient less than the gradient of contained product and, which gas will be gaseous at ambient pressure and temperature, as well as under the pressure and temperature conditions of said existing annular zone; and
(d) means for continuously maintaining and monitoring pressure on said gas supplied to said annular zone during product containment.

28. The entry configuration of claim 27 further characterized by containing a hanging string, spaced inwardly from said liner casing member and thereby providing a next annular zone therebetween, said hanging string extending substantially into said underground storage zone.

29. The entry configuration of claims 27 or 28 wherein said plug assembly is positioned in said existing annular zone in the region near the seat of said barrier casing and above same.

30. The entry configuration of claims 27 or 28 wherein said plug assembly contains gas flow restriction means providing for passage of environmentally acceptable gas therethrough.

31. The entry configuration of claims 27 or 28 wherein said liquid barrier assembly is positioned in the existing annular zone in the region of said entry headspace.

32. The entry configuration of claims 27 or 28 wherein stabilized liquid is contained in said existing annular zone by said liquid barrier assembly.

33. The entry configuration of claim 32 wherein said liquid is adjacent a receptacle and seal nipple zone of the liner casing member.

34. The entry configuration of claims 27 or 28 characterized by being the sole entry to said underground storage zone.

35. The entry configuration of claims 27 or 28 characterized by being one of a number of entries to said underground storage zone.

36. The entry configuration of claims 27 or 28 wherein noncorrosive, environmentally acceptable gas is in said existing annular zone.

37. The entry configuration of claims 27 or 28 wherein the gas in said existing annular zone is selected from the group consisting of argon, nitrogen, helium, oxygen, air, hydrocarbons and mixtures of the foregoing, with the proviso that when the product in storage includes hydrocarbon, the hydrocarbon in said existing annular zone is of lower molecular weight than the predominant hydrocarbon in said storage zone.

38. The entry configuration of claims 27 or 28 wherein said barrier casing member is sealed in place along at least a portion of its outer surface.

39. The entry configuration of claims 27 or 28 wherein said next annular zone serves as a conduit for conveying product between the entry headspace and said underground storage zone.

40. The entry configuration of claim 27 wherein said gas/liquid interface is maintained in said existing annular zone, and product or motivating liquid is contained in said liner casing member.

41. The entry configuration of claim 28 wherein said gas/liquid interface is maintained in said existing annular zone, while product and motivating liquid are also contained in said entry configuration.

42. The entry configuration of claim 41 wherein product occupies said next annular zone and motivating liquid is present in said hanging string.

43. The entry configuration of claim 41 wherein motivating liquid occupies said next annular zone and product is present in said hanging string.

44. The method of detecting a leak in an entry configuration to an underground storage zone, which entry configuration contains a casing arrangement comprising a barrier casing member and a liner casing member with an existing annular zone therebetween, wherein said barrier casing member extends along at least a portion of the length of the entry and said liner casing member is at least coextensive in length with the barrier casing member, and said entry configuration interconnects an entry headspace with a underground storage zone for containment of product under pressure, which leak detection method comprises:
  (a) introducing an environmentally acceptable gas, under pressure, to said existing annular zone, which gas has a gradient less than the gradient of product for containment and which gas will be gaseous at ambient pressure and temperature, as well as under the pressure and temperature conditions of said existing annular zone;
  (b) maintaining said gas, under pressure, in said existing annular zone during product containment; and
  (c) continuously monitoring pressure on said gas supplied to said existing annular zone during product containment.

45. The method of claim 44 wherein said entry configuration is further characterized by containing a hanging string, spaced inwardly from said liner casing member, thereby providing a next annular zone therebetween, and said method includes introducing product, under pressure, to said underground storage zone through said next annular zone.

46. The method of claims 44 or 45 wherein introduction of said gas to the existing annular zone establishes a gas/liquid interface in said zone.

47. The method of claims 44 or 45 wherein said environmentally acceptable gas introduced to said existing annular zone establishes a gas/liquid interface at about the roof of the underground storage zone.

48. The method of claims 44 and 45 wherein said environmentally acceptable gas is maintained in the existing annular zone at a pressure higher than the other pressures at the wellhead.

49. The method of detecting a leak in an entry configuration to an underground storage zone, which entry configuration contains a casing arrangement comprising a barrier casing member, an inwardly spaced apart liner casing member with an existing annular zone therebetween, and a handing string inwardly spaced from said linear casing member, thereby providing a next annular zone therebetween, wherein said barrier casing member extends long at least a portion of the length of the entry and said handing string extends substantially into the underground storage zone and wherein said entry configuration interconnects an entry headspace with and underground storage zone for containment of product under pressure, which lead detection method comprises:
  (a) introducing an environmentally acceptable gas, under pressure, to the existing annular zone which gas has a gradient less than the gradient of product for containment and which gas will be gaseous at ambient pressure and temperature, as well as under the pressure and temperature conditions of said annular zone;
  (b) maintaining pressure on the gas introduced to said existing annular zone;
  (c) introducing product, under pressure, to the next annular zone and feeding said product through same to the underground storage zone;
  (d) establishing on said environmentally acceptable gas a pressure higher than the other pressures at the wellhead; and
  (e) continuously monitoring pressure on said gas supplied to said existing annular zone during product storage.

* * * * *